United States Patent [19]
Rodosta

[11] Patent Number: 6,095,588
[45] Date of Patent: Aug. 1, 2000

[54] FOLDING TRUCK BED COVER

[76] Inventor: Fred Rodosta, 1961 Highway 3043, Opelousas, La. 70570

[21] Appl. No.: 09/161,347

[22] Filed: Sep. 25, 1998

[51] Int. Cl.[7] .................................................. B60P 7/08
[52] U.S. Cl. .................................. 296/100.09; 296/37.6; 296/183
[58] Field of Search ..................... 296/100.09, 100.06, 296/37.6, 37.5, 183

[56] References Cited

U.S. PATENT DOCUMENTS

| | | | |
|---|---|---|---|
| 4,036,521 | 7/1977 | Clenet | 296/100 |
| 4,313,636 | 2/1982 | Deeds | 296/100 |
| 4,418,954 | 12/1983 | Buckley | 296/100 |
| 4,747,441 | 5/1988 | Apolzer et al. | 160/84.1 |
| 4,749,226 | 6/1988 | Heft | 296/37.6 |
| 4,844,531 | 7/1989 | Kooiker | 296/100 |
| 4,943,194 | 7/1990 | Aguilar | 296/37.6 X |
| 4,946,217 | 8/1990 | Steffens et al. | 296/100 |
| 5,040,843 | 8/1991 | Russell et al. | 296/98 |
| 5,087,093 | 2/1992 | Repetti | 296/100 |
| 5,102,180 | 4/1992 | Finley | 296/37.6 |
| 5,366,124 | 11/1994 | Dearborn, IV | 224/42.46 |
| 5,427,428 | 6/1995 | Ericson et al. | 296/98 |
| 5,464,264 | 11/1995 | Wilson | 296/37.6 |
| 5,636,893 | 6/1997 | Wheatly et al. | 296/100.09 X |
| 5,961,173 | 10/1999 | Repetti | 296/37.6 |

*Primary Examiner*—Joseph D. Pape
*Attorney, Agent, or Firm*—Roy, Kiesel & Tucker

[57] ABSTRACT

A folding truck bed cover is disclosed having a front panel, a rear panel, and at least one intermediate panel with the width of the panels converging from the front of the truck to the rear, allowing the rear panel to fold down into the bed and form a storage box within the truck bed when the truck bed cover in folded up toward the front of the truck.

20 Claims, 6 Drawing Sheets

FOLDING TRUCK BED COVER

BACKGROUND OF THE INVENTION

1. Field of the Invention

This invention relates to a cover for a pick-up truck bed, more particularly to a cover having folding panels wherein a storage box is formed in the front of the truck bed when the panels are folded up toward the front of the bed.

2. Prior Art

There are many foldable truck bed covers that are used to cover truck beds. The present state of the art can be seen in U.S. Pat. No. 4,946,217 to Steffens, et al., U.S. Pat. No. 5,087,093 to Repetti, U.S. Pat. No. 5,427,428 to Ericson et al., U.S. Pat. No. 4,313,636 to Deeds, and U.S. Pat. No. 4,418,954 to Buckley. Furthermore, there are many devices in the art for use as storage boxes. However, there exists a need for a foldable truck bed cover that can fold up and form a lockable storage box in the front of the truck bed. At least one device has attempted to combine the two into a single invention.

U.S. Pat. No. 4,749,226 to Heft discloses a device mounted in the rear of a truck that can form a storage box in the truck with the walls of the truck forming three sides of the box and the tailgate forming another side. The device in Heft is connected on one side to the floor of the pick-up truck bed and is not adaptable for the dual use as a truck bed cover. Furthermore, Heft does not disclose the use of panels that taper from front to rear to adapt to pick-up trucks having tapered beds.

There are additional advantages of the present invention not found in the prior art. This invention allows a user to rapidly and easily convert a completely covered watertight truck bed to a storage box formed in the front of the truck bed, allowing access to nearly 70% of the truck bed. This invention also allows access to the truck bed so that a trailer hitch can be placed in the bed in front of the rear axle to pull fifth-wheel trailers without removing the entire cover from the truck and while allowing full access to a watertight storage box.

OBJECTS OF THE INVENTION

With the aforementioned considerations in mind, it is therefore an object of this invention to provide a foldable truck bed cover that covers a truck bed that can also form a storage box in the front of the truck bed.

It is a further object of this invention to provide a foldable truck bed cover that is lockable when the cover is extended over the bed and when the panels are folded up and form a storage box.

It is a further object of this invention to provide a foldable truck bed cover that easily adapts to tapered truck beds.

These and other advantages and objects of this invention shall become apparent from the ensuing description of the invention.

SUMMARY OF THE INVENTION

A folding truck bed cover for a truck bed is disclosed for a truck or other vehicle having a front and a rear and having walls extending upwards from the truck bed. The folding truck bed cover comprises a plurality of panels foldably attached to each other. The panels include a front panel positioned at or near the front of the truck bed, a rear panel, at least one intermediate panel foldably attached between the front and rear panels. The panels are adapted to cover the truck bed when the panels are unfolded, and the rear panel is adapted to fold down into the front of the truck bed between the walls when the panels are folded up toward the front of the truck bed.

DETAILED DESCRIPTION OF PREFERRED EMBODIMENTS OF THE INVENTION

Figure 1:
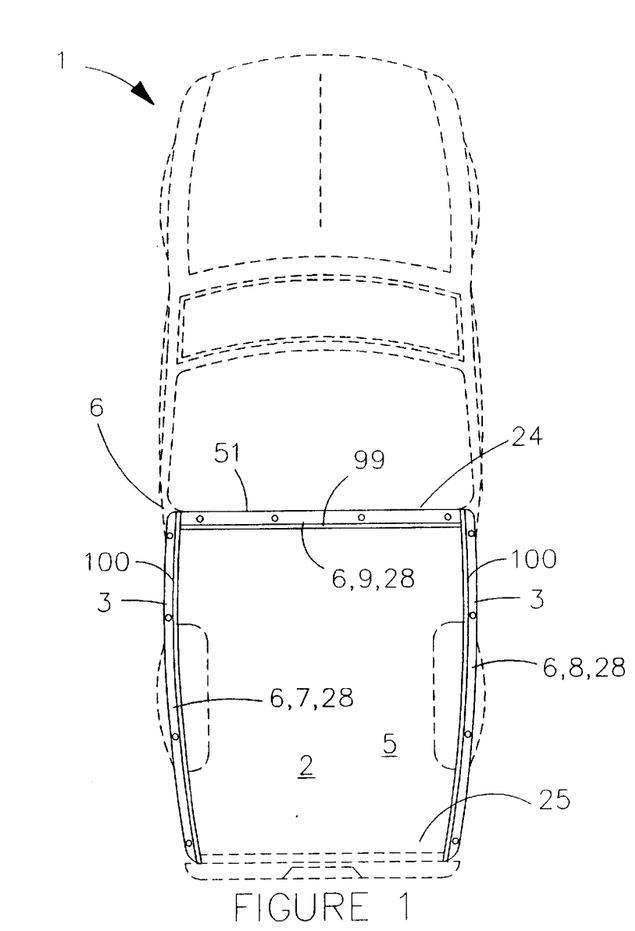
FIG. 1 is a top view of the bed of a truck having a tapered bed.
Figure 2:
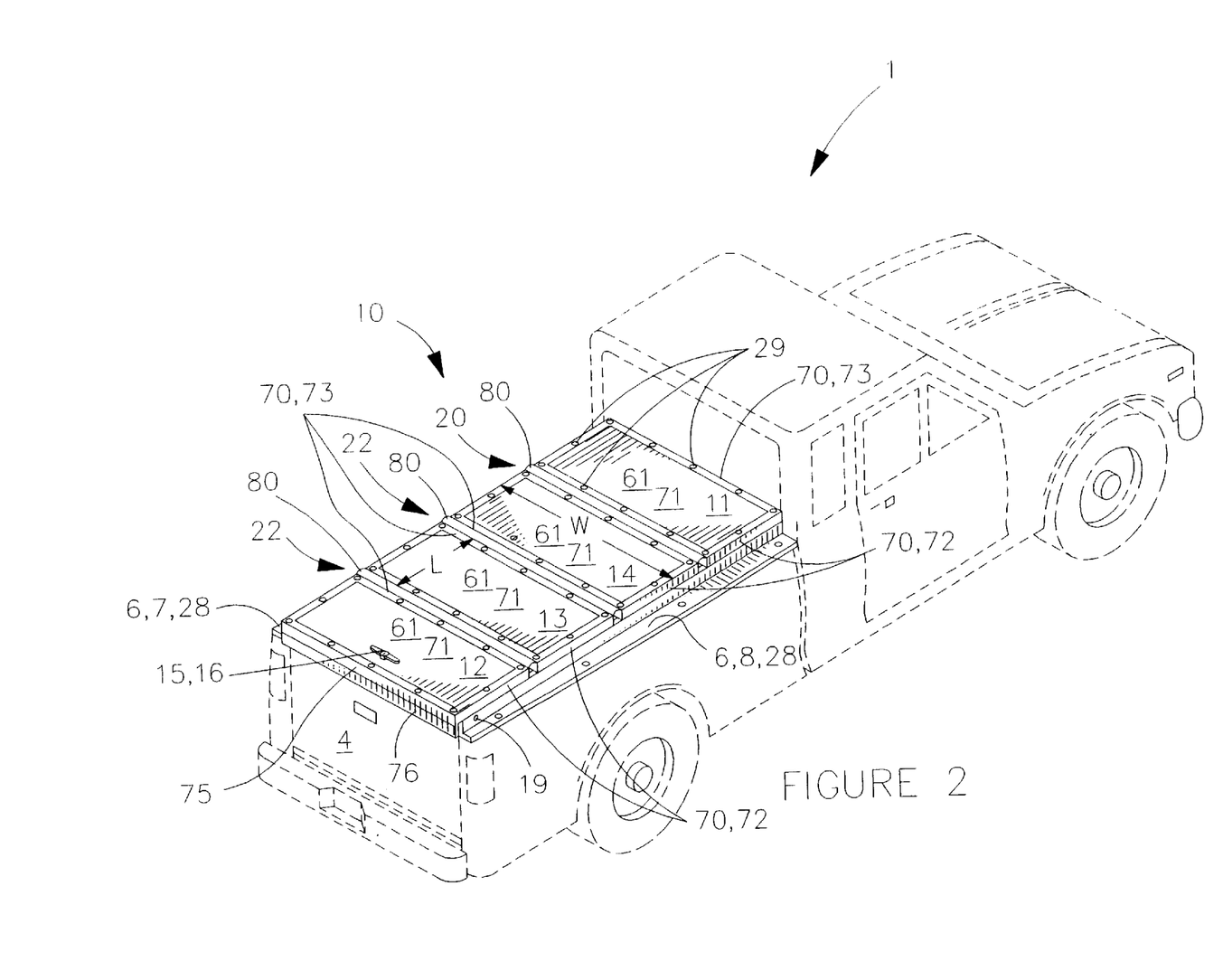
FIG. 2 is a perspective view of the truck bed cover invention folded down over the bed of a truck.
Figure 3:
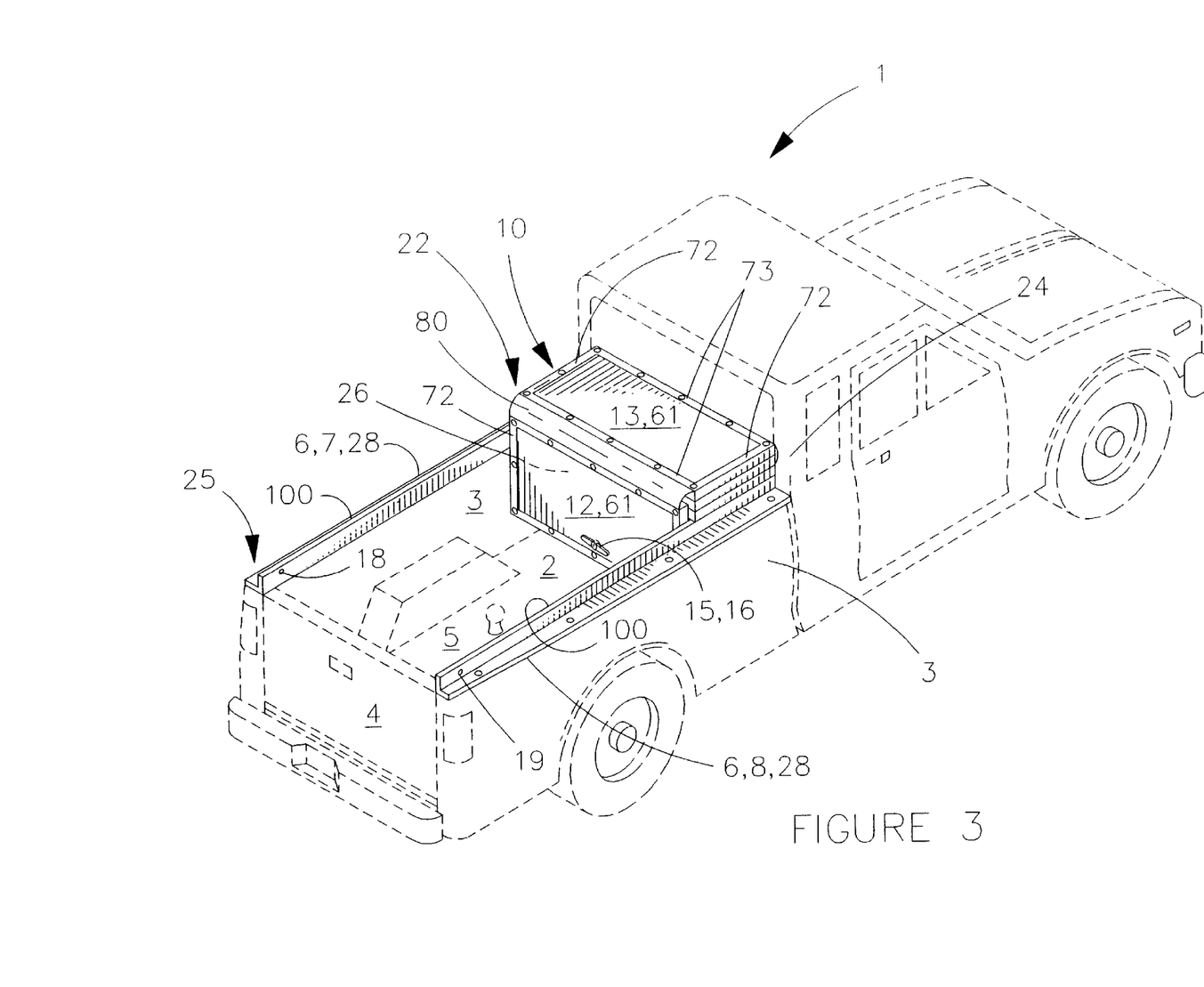
FIG. 3 is a perspective view of the truck bed cover invention folded up and forming a storage box in the front of the bed of a truck.

As shown in FIGS. 2 and 3, cover 10 can be placed over the bed 2 of a pick-up truck 1 to protect material located within bed 2. Bed 2 is bounded on the front 24 by front wall 51, on two sides by side walls 3, on the rear 25 by tailgate 4, and on the bottom by bed floor 5. The walls 3, 51 extend upward from bed floor 5. Many trucks 1 have been constructed with beds 2 which taper in width approximately one to three inches from front 24 to rear 25 as shown in FIG. 1 (slightly exaggerated). When folded down, cover 10 covers bed 2 as shown in FIG. 2, and when folded up, rear panel 12 can optionally fold down into bed 2 to form a storage box 26 within front 24 of bed 2 as shown in FIG. 3.

Figure 4:
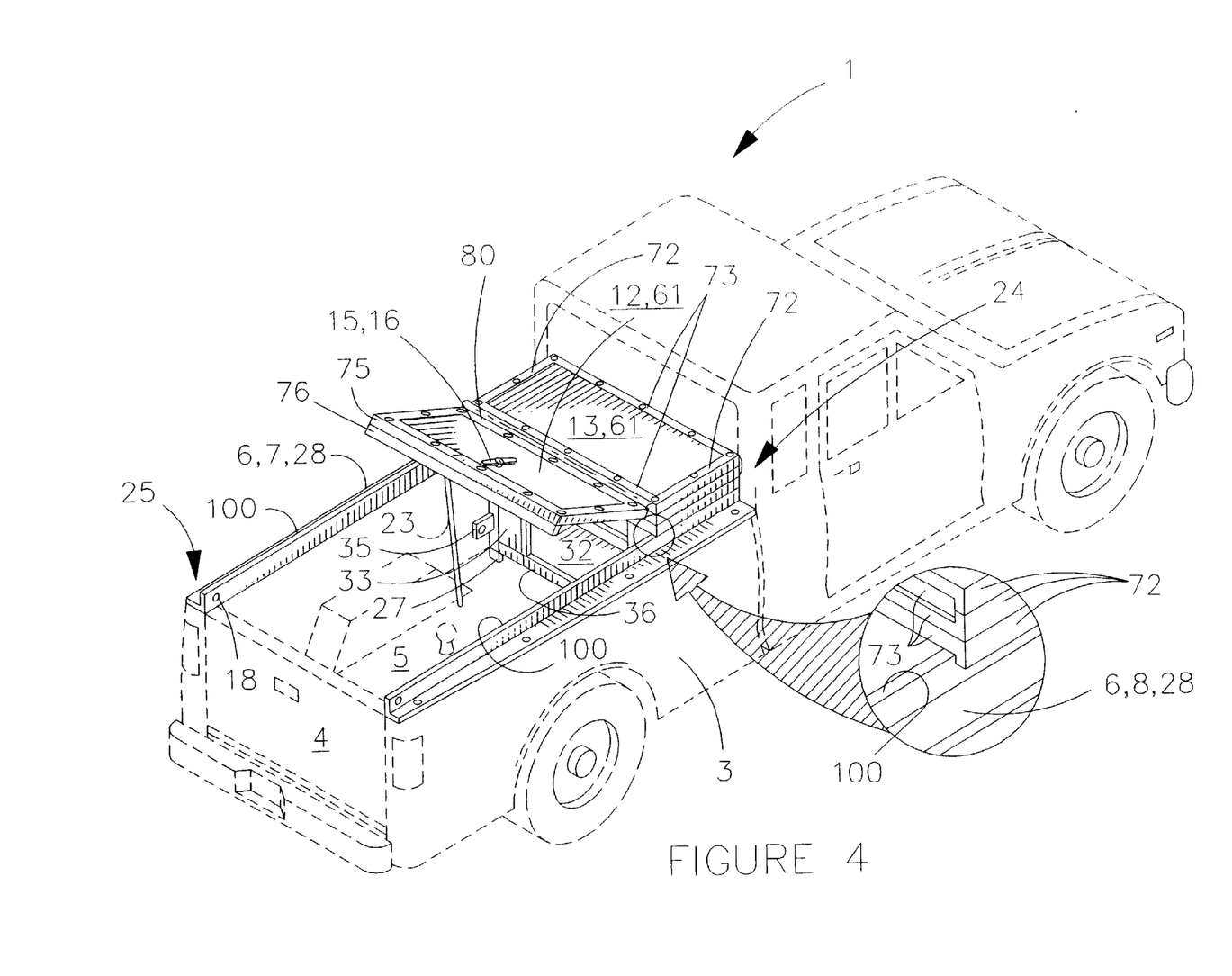
FIG. 4 is a perspective view of the truck bed cover invention folded up and having the rear panel extended to show the storage box formed with the bed of a truck.

The invention generally comprises a support assembly 28, cover 10 and a box frame 31. However, in embodiments not shown in the Figures, the cover 10 can be positioned directly onto the walls 3, 51, eliminating the need for the support assembly 28. As shown in FIG. 1, support assembly 28 comprises a frame 6 having a base 9 and two sides 7, 8 positioned on the bed walls 3, 51 as shown in FIGS. 2–4. Support assembly 28 could also be attached to walls 3, 51. Base 9 is positioned on or attached to front wall 51. Sides 7, 8 could be attached to base 9. Near front 24, the top surface 100 of sides 7, 8 extends preferably about three inches above the top of side wall 3 as shown in FIGS. 5a–5d. Top surface 99 of base 9 also extends preferably about three inches above front wall 51. Frame 6 is constructed so that sides 7, 8 taper in height from front 24 to rear 25. The height of sides 7, 8 preferably remains about three inches on a portion of sides 7, 8 extending back from front wall 51 a distance equal to the length of front panel 11, where the height tapers from about three inches to about one inch above side wall 3 near rear 25. Frame 6 is preferably constructed from aluminum angle and can be bolted into the existing stake holders that are built into the side and front walls of most pick-up trucks. As shown in FIG. 3, each side 7, 8 has an aperture 18, 19 near rear 25 to allow the lock 15 on cover 10 (see FIG. 6) to lock cover 10 onto frame 6.

Figure 5A:
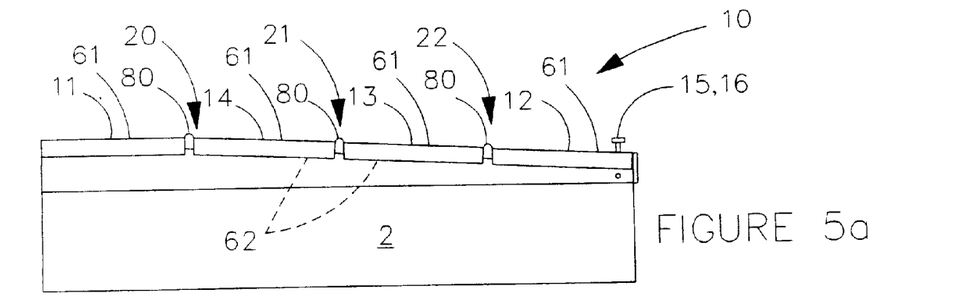
FIG. 5a is a partial side view of the truck bed cover invention as shown in FIG. 1.
Figure 5B:
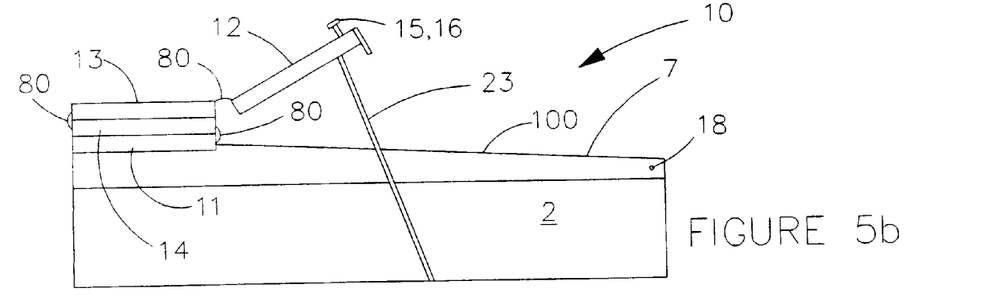
FIG. 5b is a partial side view of the truck bed cover invention as shown in FIG. 2.

As shown in FIG. 2, cover 10 comprises at least a front panel 11 and a rear panel 12, but preferably comprises four panels, including two intermediate panels 13, 14. Panel 11 is connected (for example, by bolts) to base 9 and rests upon sides 7, 8. Panels 11, 12, 13, 14 each have an upper surface 61 and a lower surface 62 so that lower surface 62 faces floor 5 when cover 10 is folded down as shown in FIG. 5a.

Each panel 11, 12, 13, 14 is preferably constructed with a panel frame 70 which fits around a panel member 71. Panel frame 70 is attached to panel member 71 in any convenient manner, such as by using bolts or screws 29. Each panel member 71 is preferably constructed from a lightweight material such as wood, fiberglass, plastic or a similar material having a thickness of about one-half inch. Panel frame 70 is composed of panel frame cross members 73 and panel frame sides 72 are constructed from inverted L-shaped aluminum framing material (aluminum angle). Panel frame sides 72 are constructed from one-inch aluminum angle allowing panel frame sides 72 to overlap sides 7, 8 as shown in FIG. 4. Panel frame cross members 73 are preferably constructed from three-quarter-inch aluminum angle.

Rear panel 12 has a pair of rear cross members 75, 76 (shown in FIG. 8) allowing cover 10 to overlap tailgate 4. Rear cross member 75 is constructed from 1½ inch aluminum angle and is attached to upper surface 61 of rear panel 12, while rear cross member 76 is constructed from 2 inch aluminum angle and is attached to lower surface 62 of rear panel 12. By using both rear cross members 75, 76 unauthorized access to bed 2 is limited when cover 10 is folded down by preventing tailgate 4 from opening.

When cover 10 is folded up as shown in FIGS. 3–5, upper surface 61 of front panel 11 will face upper surface 61 of intermediate panel 14, lower surface 62 of intermediate panel 13 will face lower surface 62 of intermediate panel 14, thereby allowing either (i) the upper surfaces 61 of intermediate panel 13 and rear panel 12 to face one another (opening bed 2 completely); or, (ii) rear panel 12 to fold down into bed 2 to form storage box 26 on two sides by cover 10 and on four sides by bed 2 and walls 3, 51 as shown in FIG. 3.

Each of the panels 11, 12, 13, 14 has a length L and a width W as denoted in FIG. 2. In one embodiment, the preferred length L of each panel 11, 13, 14 is approximately 26 inches, while panel 12 is about 21 inches long. This allows rear panel 12 to fold down between walls 3 near front 24 and form storage box 26. This length also allows a three-inch clearance between floor 5 and rear panel 12 so that bed 2 can be loaded with elongated relatively flat items, such as lumber, which can fit under storage box 26. Rear panel 12 may also be configured so that it folds down into bed 2 and extends down to bed floor 5. Other length configurations may be possible as long as rear panel 12 can fold down into bed 2.

The length configuration of the four panels 11, 12, 13, 14 allows rear panel 12 to fit between side walls 3 at precisely the point necessary for rear panel 12 to fold down and form storage box 26. If the lengths of the panels 11, 12, 13, 14 are adjusted in either direction then: (a) rear panel 12 will either be too wide to fit within bed 12; or, (b) rear panel 12 will fold down into bed 2 but will not properly fit to form a secure storage box 26 within the front of bed 2. Though not shown in the Figures, panel frame sides 72 on rear panel 12 may also have apertures 18, 19 formed partly therein to allow lock 15 to slidably engage sides 7, 8 and extend therethrough.

Width W of each panel 11, 12, 13, 14 tapers from front to rear. As seen in FIG. 1, in many trucks, the width of bed 2 tapers approximately 1–2 inches from the front 24 (about 64¼ inches) to the rear 25 (about 62¼ inches) depending on the make and model of the truck. Width W of panels 11, 12, 13, 14 will taper from front to rear according to the tapering width of bed 2. In an embodiment adapted to fit a Chevrolet pick-up truck, front panel 11 measures from 65¼ inches wide near front 24 and tapers to 64⅞ inches; panel 13 tapers from 65¾ inches to 64¾ inches; panel 14 tapers from 64 inches to 63½ inches; rear panel 12 tapered from 63 inches to 62½ inches at rear 25.

Front panel 11 can be fixedly attached to frame 6 at the front 24 of bed 2 using any conventional connecting means, including nuts and bolts or rivets. Alternatively, though not shown in the Figures, front panel 11 can be positionable on the walls 3, 51 or the frame 6 near front 24 so that when cover 10 is folded down to cover bed 2, front panel 11 may fold open, allowing access to the front 24 of bed 2. This configuration allows access to storage box 26 (discussed later) in embodiments which include box frame 31 when cover 10 covers bed 2.

In an embodiment shown in FIG. 2, intermediate panel 14 hingedly connects to front panel 11 via hinge 20 and to intermediate panel 13 via hinge 21. Intermediate panel 13 hingedly connects to intermediate panel 14 via hinge 21 and to rear panel 12 via hinge 22. Hinges 20, 21, and 22 can be any hinges known in the art, but are preferably piano or continuous hinges attached to panel members 71. The attachment is made using bolts, screws, or other means known in the art. The hinges 20, 21, 22 extend the length of panels 11, 12, 13, 14 and allow them to fold upon one another. Additionally, panels 13, 14 can also have an additional piece of aluminum angle attached to upper surface 61 (not shown) between panel frame sides 72 to prevent panel 13, 14 so as to stiffen them and prevent sagging when cover 10 is folded down over bed 2.

Figure 7:
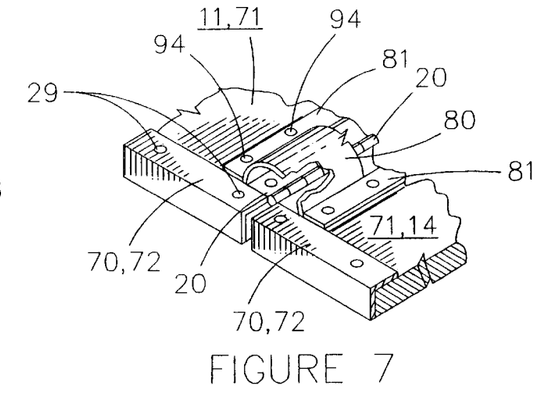
FIG. 7 is a partial view of the hinge/cover combination between the panels.

As shown in FIG. 7, to make cover 10 waterproof, a hinge cover 80, preferably of rubber-like (expandable and waterproof/water-resistant) material approximately ⅛ inches thick, is placed over hinges 20, 21, 22. A three-quarter-inch aluminum strip 81 is then placed over the edges of hinge cover 80 and attached to panel member 71 using bolts 94, or other fastening means, to provide a watertight seal around the hinges 20, 21, 22. Hinge cover 80 can extend out over frame 6 and side walls 3 to help prevent leaks at each hinge 20, 21, 22 between the cover 10 and frame 6. The rubber material could also be used to form a seal between the panel members 71 and panel framing 70. In other embodiments, caulking could be used to make the seal between panel members 71 and panel framing 70 watertight.

Figure 6:
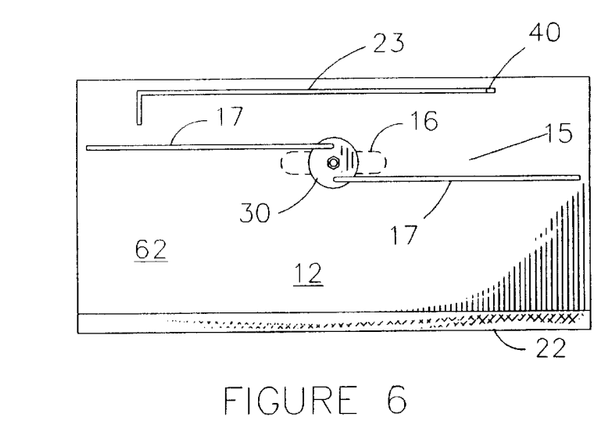
FIG. 6 is a view of the underside of the rear panel of the truck bed cover invention showing the locking mechanism used to lock the rear panel in place.

As shown in FIGS. 2, 3 and 6, rear panel 12 is equipped with a lock 15 which allows cover 10 to be locked when it covers bed 2 and when rear panel 12 folds down to form storage box 26. Lock 15 comprises a handle 16 attached to upper surface 61 of rear panel 12 which turns a disk 30 adjacent to lower surface 62 of rear panel 12. Pivotally attached to opposite sides of disk 30 are a pair of rods 17 which are engagable with apertures 18, 19 in frame 6. As handle 16 is turned, rods 17 move to disengage apertures 18, 19 thereby releasing cover 10 from the locked position. When handle 16 is turned in an opposite direction, rods 17 move toward sides 7, 8 thereby engaging apertures 18, 19. Lock 15 could also include a means for locking handle 16 to prevent rods 17 from disengaging apertures 18, 19. In embodiments where no support assembly 28 is used, alternative locking devices can be used to lock rear panel 12 directly onto the bed 2 or the side walls 3 of the truck 1.

Figure 5C:
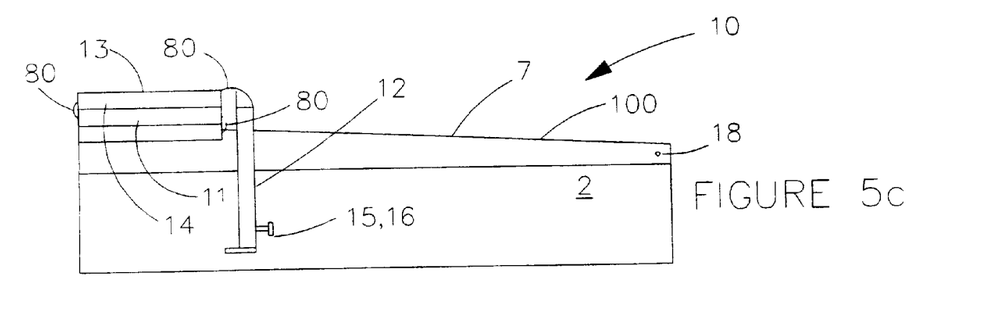
FIG. 5c is a partial side view of the truck bed cover invention as shown in FIG. 3.
Figure 5D:
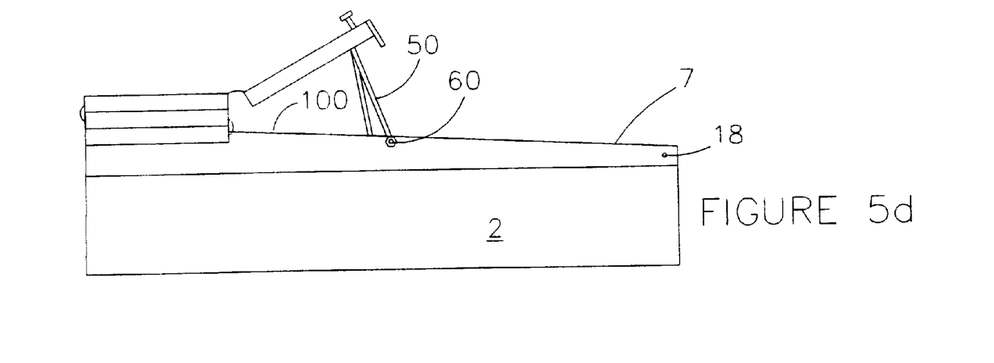
FIG. 5d is a partial side view of the truck bed cover invention showing an alternative embodiment for holding up the rear panel of the cover.

As shown in FIGS. 4, 5c and 6, rear panel 12 is also equipped with a support rod 23 attached to its lower surface 62 such that, when cover 10 is folded up, rear panel 12 can be held in a raised position while a user accesses storage box 26. Support rod 23 can have a rubberized tip 40 such that it rests on bed floor 5 and frictional forces prevent it from sliding against the bed floor 5. In another embodiment shown in FIG. 5d, a pair of support rods 50 attached at opposite ends of rear panel 12 can be used. The support rods 50 are constructed to be engageable with apertures 60 in sides 7,8 of frame 6.

Figure 8:
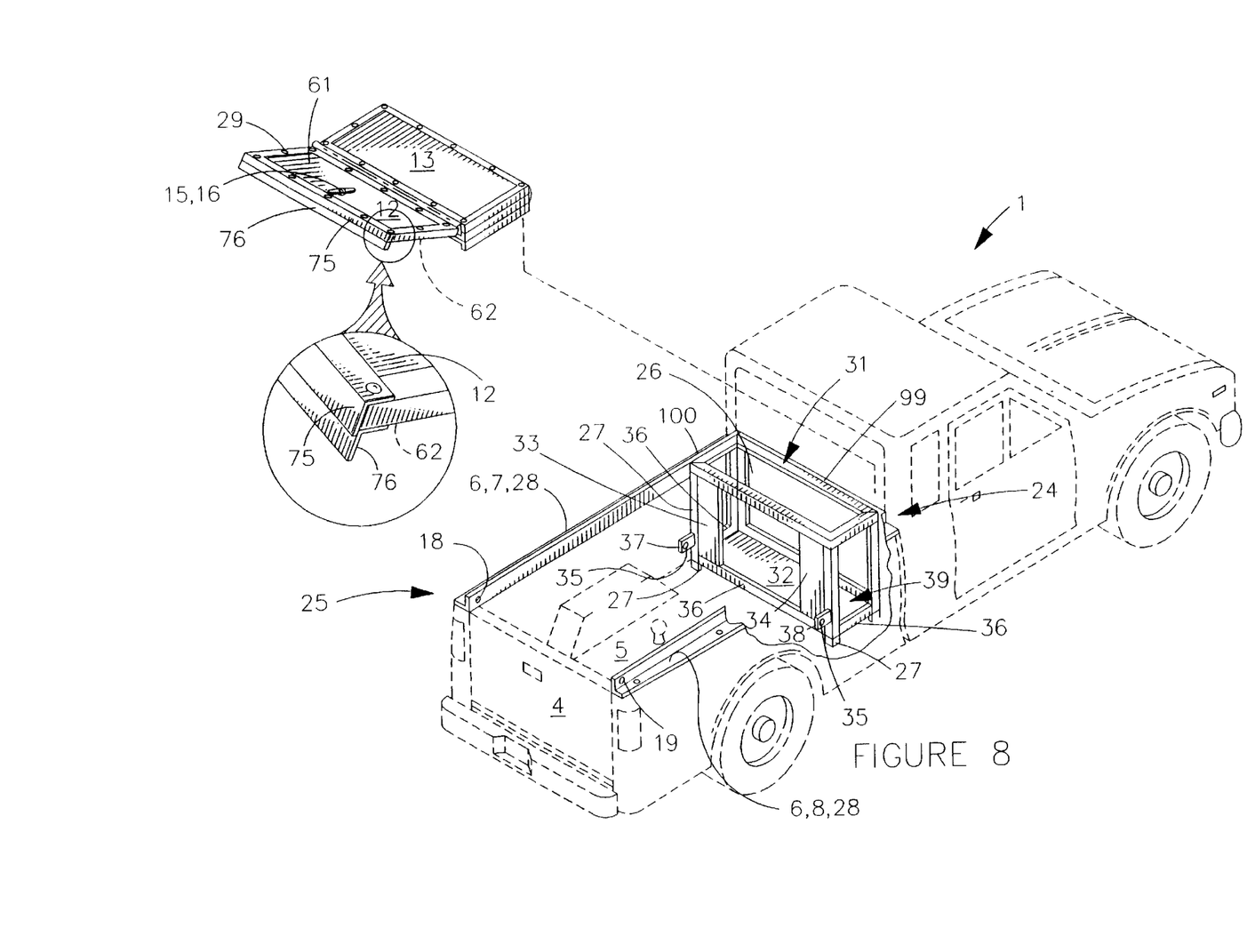
FIG. 8 is a view of the box frame within the bed with the cover exploded from the bed.

Box frame 31 is positioned below front panel 11 and may be attached to front panel 11 or to walls 3, 51. As shown in FIG. 8, box frame 31 is preferably constructed from one-inch aluminum angle members all of which are connected together to form a rectangular box-like frame 31. The connections can be made using bolts or welding. A bottom panel 39 forms a raised bottom 32 of box 26. Bottom members 36 are preferably attached to the legs 27 to provide a three-inch clearance between bottom 32 and bed floor 5 as discussed earlier. Side panels 33, 34 provide additional security to storage box 26 so that when rear panel 12 is folded down, box 26 is not easily accessible from the small space that may exist between rear panel 12 and box frame 31. Attached at either end of box frame 31 are lock members 37, 38 having apertures 35 therein to allow rods 17 to slidingly engage lock members 37, 38 and lock rear panel 12 in place.

Although not shown in the drawings rear panel 12 can have other locking devices attached thereto that are well known in the art to facilitate locking cover 10 as a truck bed cover and as a storage box 26.

Other devices known in the art can be used for support assembly 28 as long as they support cover 10 when folded down over bed 2 and allow rear panel 12 to fold down between side walls 3 near front 24 and form storage box 26. The support clips shown in U.S. Pat. No. 4,749,226 to Heft (incorporated herein by reference) shows such an alternative to the frame disclosed herein.

Although the preferred embodiment has been described, it will be appreciated by those skilled in the art to which the present invention pertains that modifications, changes, and improvements may be made without departing from the spirit of the invention defined by the claims.

I claim:

1. A folding truck bed cover for a truck bed having a front and a rear and having side walls extending upwards from said bed, said cover comprising:
   a plurality of panels foldably attached to each other, said plurality of panels comprising:
   (a) a front panel positionable at or near said front of said truck bed;
   (b) a rear panel;
   (c) at least one intermediate panel foldably attached between said front panel and said rear panel;
   said plurality of panels adapted to cover said truck bed when said plurality of panels is unfolded, said rear panel having a width less than the distance between said side walls near said front of said truck bed so that said rear panel folds down near said front of said truck bed between said side walls when said plurality of panels is folded toward said front of said truck bed.

2. The folding truck bed cover according to claim 1 having an even number of intermediate panels.

3. The folding truck bed cover according to claim 1 further comprising a box frame, said box frame positioned below said front panel within said truck bed.

4. The folding truck bed cover according to claim 1 further comprising a support assembly positioned on at least one of said side walls.

5. The folding truck bed cover according to claim 4 further comprising a lock, said lock adapted to lock said rear panel to said support assembly.

6. The folding truck bed cover according to claim 1 further comprising a lock, said lock adapted to lock said rear panel to at least one of said side walls.

7. The folding truck bed cover according to claim 3 further comprising a lock, said lock adapted to lock said rear panel to said box frame.

8. The folding truck bed cover according to claim 5 wherein said support assembly comprises a frame, said frame comprising a pair of sides, said frame engageable with said plurality of panels.

9. The folding truck bed cover according to claim 1 wherein said support assembly comprises at least one support member.

10. The folding truck bed cover according to claim 1 wherein the width of said plurality of panels tapers from said front panel to said rear panel.

11. The combination comprising:
    a truck having a bed and side walls extending upward from said bed, said bed having a width which tapers from front to rear;
    a folding truck bed cover, said cover comprising:
    a plurality of panels foldably attached to each other, said plurality of panels comprising:
    (a) a front panel positionable on said side walls near said front of said truck bed;
    (b) a rear panel;
    (c) at least one intermediate panel foldably attached between said front panel and said rear panel;
    said plurality of panels adapted to cover said truck bed when said plurality of panels is unfolded, said rear panel having a width less than the distance between said side walls near said front of said truck bed so that said rear panel folds down near said front of said truck bed between said side walls when said plurality of panels is folded toward said front of said truck bed.

12. The combination according to claim 11 wherein said plurality of panels has an even number of intermediate panels.

13. The combination according to claim 11 further comprising a box frame, said box frame positioned below said front panel within said truck bed.

14. The combination according to claim 11 further comprising a support assembly positioned on at least one of said side walls.

15. The combination according to claim 14 further comprising a lock, said lock adapted to lock said rear panel to said support assembly.

16. The combination according to claim 11 further comprising a lock, said lock adapted to lock said rear panel to at least one of said side walls.

17. The combination according to claim 13 further comprising a lock, said lock adapted to lock said rear panel to said box frame.

18. The combination according to claim 14 wherein said support assembly comprises a frame, said frame comprising a pair of sides, said frame engageable with said plurality of panels.

19. The combination according to claim 11 wherein said support assembly comprises at least one support member.

20. The combination according to claim 11 wherein the width of said plurality of panels tapers from said front panel to said rear panel.

* * * * *